United States Patent
Lemmons

(10) Patent No.: US 6,481,011 B1
(45) Date of Patent: Nov. 12, 2002

(54) PROGRAM GUIDE SYSTEM WITH USER DESIGNATED COLOR CODING

(75) Inventor: Thomas R. Lemmons, Sand Springs, OK (US)

(73) Assignee: Prevue Networks, Inc., Tulsa, OK (US)

( * ) Notice: Subject to any disclaimer, the term of this patent is extended or adjusted under 35 U.S.C. 154(b) by 0 days.

(21) Appl. No.: 09/234,155

(22) Filed: Jan. 19, 1999

Related U.S. Application Data

(60) Provisional application No. 60/089,485, filed on Jun. 16, 1998.

(51) Int. Cl.[7] .................................................. H04N 5/445
(52) U.S. Cl. ............................................ 725/47; 725/44
(58) Field of Search ........................ 725/39–55; 348/906, 348/569

(56) References Cited

U.S. PATENT DOCUMENTS

| | | | |
|---|---|---|---|
| 5,589,892 A | 12/1996 | Knee et al. ................... | 348/731 |
| 5,630,119 A | 5/1997 | Aristides et al. ............. | 395/601 |
| 5,781,246 A | 7/1998 | Alten et al. .................. | 348/569 |
| 5,793,438 A | 8/1998 | Bedard ......................... | 348/569 |
| 5,844,620 A * | 12/1998 | Coleman et al. ............. | 348/461 |
| 5,929,932 A * | 7/1999 | Otsuki et al. ................ | 348/569 |
| 5,973,682 A * | 10/1999 | Saib et al. .................... | 345/327 |
| 6,166,728 A * | 12/2000 | Haman et al. ............... | 345/327 |
| 6,177,931 B1 * | 1/2001 | Alexander et al. .......... | 345/327 |
| 6,278,493 B1 * | 8/2001 | Takahashi et al. .......... | 348/569 |

FOREIGN PATENT DOCUMENTS

| | | | | |
|---|---|---|---|---|
| WO | 86/01962 A1 | 3/1986 | ............ | H04N/7/16 |
| WO | 94/29840 A1 | 12/1994 | ............ | G09G/1/14 |
| WO | 97/48230 A1 | 12/1997 | ............ | H04N/7/00 |

* cited by examiner

Primary Examiner—Victor R. Kostak

(57) ABSTRACT

An interactive television program guide system is provided in which a user may inform a program guide of the user's interests. Information on the user's interests may be stored in a preference profile. There may be more than one preference profile, each for a different user. Each preference profile contains a number of preference attributes (program titles, genres, viewing times, channels, actors, etc.). A color is associated with each preference attribute. The user is thus able to view the program listing and quickly identify programs of interest by the associated colors in the display.

74 Claims, 13 Drawing Sheets

90

| PROGRAM CRITERIA (92) | COLOR (94) |
|---|---|
| 60 MINUTES | BLUE |
| SEINFELD | RED |
| JOHN WAYNE | YELLOW |
| AUDREY HEPBURN | PURPLE |
| SOAP ORERA | ORANGE |
| GOLF | GREEN |

*FIG. 6*

| PROFILE NO.1 | PROFILE NO.2 | PROFILE NO.3 |
|---|---|---|
| SEINFELD - BLUE<br><br>60 MINUTES - RED<br><br>DRAMA - ORANGE | ER - YELLOW<br><br>COMEDY - RED | COMEDY - YELLOW<br><br>JAMES STEWART - BLUE<br><br>X-FILES - GREEN |

PROGRAM GUIDE SYSTEM WITH USER DESIGNATED COLOR CODING

CROSS-REFERENCE TO RELATED APPLICATIONS

This application claims the benefit of U.S. provisional patent application No. 60/089,485, filed Jun. 16, 1998.

BACKGROUND OF THE INVENTION

This invention relates to interactive television program guides, and more particularly, to television program guides in which users may create profiles of their programming preferences. Profiles contain information about the user's interests (e.g., favored or disfavored programming genres, actors, channels, series, etc.) The profiles are used by the program guide in determining how programming information is presented to the user.

Cable, satellite, and broadcast television systems provide users with a large number of television channels. Users have traditionally consulted printed television program schedules to determine the programs being broadcast at a particular time. More recently, interactive electronic television program guides have been developed that allow television program information to be displayed on a user's television.

Interactive program guides are typically implemented on set-top boxes. Such program guides allow users to view television program listings in different display formats. For example, a user may instruct the program guide to display a grid or table of program listings organized in a channel-ordered or a time-ordered list. Users may also search and sort program listings by genre (e.g., movies, sports, etc.) or by title (i.e., alphabetically). A user may obtain additional information for a program by placing a highlight region on a desired program listing and pressing an "info" button. The user may purchase a pay program from the program guide by placing the highlight region on a program listing and pressing an "OK" button. Some systems allow the user to select a program for recording by placing the highlight region on a program listing and pressing a "record" button.

Because there are so many television channels available, particularly with cable and satellite television systems, television program guides have been developed that allow users to designate favorite channels or broad programming categories, or genres.

This approach is not very selective. Even though a user may have chosen a channel to be highlighted in color, some of the programming that appears on that channel may not be of interest to the user. The same would apply to program genres, wherein not all movies, nor all sports events, etc., would be of interest to the user. Moreover, programs that would be of interest to the user often appear on channels or in genres that the user has not chosen as favorites (e.g., because the user does not like most of the programming on that channel or in that genre).

What is needed is a more sophisticated way in which a user may inform a program guide of the user's preferences, so that the program guide can more accurately highlight programming of the type the user likes.

It is therefore an object of the present invention to provide a program guide system with which a user may set up a profile based on various preference attributes indicative of a user's interests.

SUMMARY OF THE INVENTION

These and other objects of the invention are accomplished in accordance with the principles of the present invention by providing a interactive television program guide system in which a user may inform a program guide of the user's television programming interests. The user may specify a number of program characteristics such as program title, genre or category, rating, actor, etc. as preferred attributes. For each preferred attribute, the user may select a particular color. A preference attribute and its respective color are associated as a display criterion. A plurality of display criteria may be set by the user. The programming list may be displayed based on the display criteria, i.e. the preference attributes and selected colors.

The program guide may be created or modified by selecting program characteristics as preferred attributes. Each preference attribute is assigned a color by the user. Alternatively, the program guide may be created or modified by highlighting a program listing or selecting a program to which to which the user has tuned. The program characteristics of the highlighted program listing or the selected program may be selected as preference attributes to which colors are assigned.

A user may define the display format of each program. For example, a user may define the maximum number of colors that may be displayed for a single program. A user may define a preferred sort order for display criteria and may display colors in the defined sort order.

The program guide may maintain the display criteria in a preference profile. Different preference profiles may be used by different users of the same program guide. If desired, more than one preference profile may be active at a given time. A master profile may be used that has settings that override the settings in other profiles.

Further features of the invention, its nature and various advantages will be more apparent from the accompanying drawings and the following detailed description of the preferred embodiments.

BRIEF DESCRIPTION OF THE DRAWINGS

FIG. 6 is a diagram of an illustrative preference profile showing how multiple display criteria of the same type may be associated with the same preference profile.

DETAILED DESCRIPTION OF THE PREFERRED EMBODIMENTS

Figure 1:
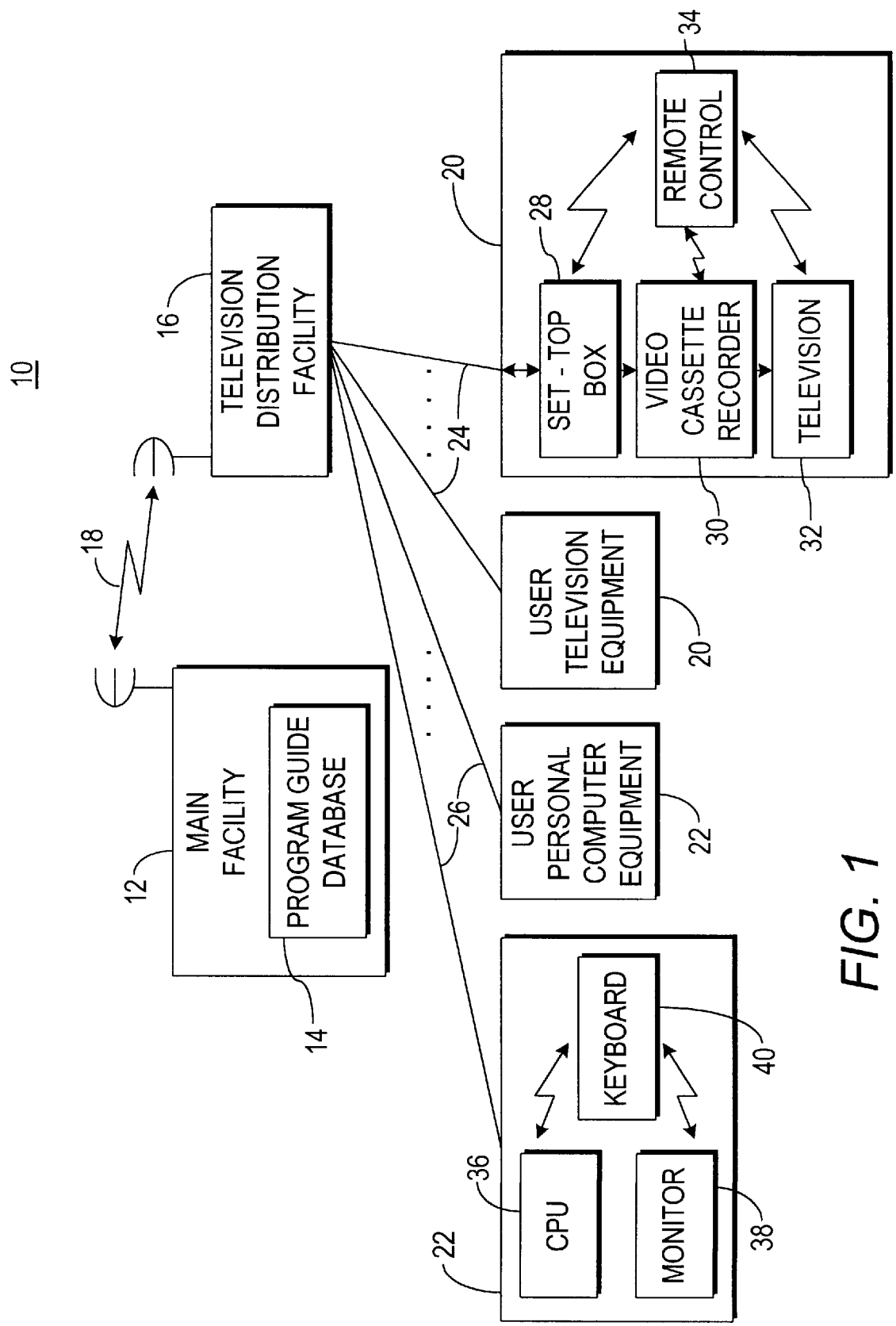
FIG. 1 is a diagram of a system in which an interactive television program guide is implemented in accordance with the present invention.

An illustrative program guide system 10 in accordance with the present invention is shown in FIG. 1. Main facility 12 contains a program guide database 14 for storing program guide information such as television program guide listings data, pay-per-view ordering information, television program promotional information, etc. Information from database 14 may be transmitted to television distribution facility 16 via communications link 18. Link 18 may be a satellite link, a telephone network link, a cable or fiber optic link, a microwave link, a combination of such links, or any other suitable communications path. If it is desired to transmit video signals over link 18 in addition to data signals, a relatively high bandwidth link such as a satellite link is generally preferable to a relatively low bandwidth link such as a telephone line.

Television distribution facility 16 is a facility for distributing television signals to users. Television distribution facility 16 may be, for example, a cable system headend, a broadcast distribution facility, a satellite television distribution facility, or any other distribution facility.

The program guide information transmitted by main facility 12 to television distribution facility 16 includes television program listings data for current and future television programs. The television program listings data for each program preferably includes program information, e.g., the title of the program, the channel for the program, a scheduled broadcast time (start time) and an ending time (or duration). Other typical program information include ratings, critics ratings, descriptions, genres (sports, movies, children, etc.), actors, etc. Transmitted program information may also include advertising information and pay program data such as pricing information for individual programs and subscription channels, time windows for ordering programs and channels, telephone numbers for placing orders that cannot be impulse ordered, etc.

Television distribution facility 16 distributes television programming and program information to the user television equipment 20 or the user personal computer (PC) equipment 22 of multiple users via communications paths 24 and 26, respectively.

For example, television programming may be distributed over analog television channels and program guide data may be distributed over an out-of-band channel on paths 24. Data distribution may also involve using one or more digital channels on paths 24 and 26. Such digital channels may also be used for distributing television programming and other information. Multiple television and audio channels (analog, digital, or both analog and digital) may be provided to set-top boxes 28 via communications paths 24. Program listings and other information may be distributed via communications paths 26 to PC equipment 22. In addition, program listings and other data may also be distributed by one or more distribution facilities that are similar to but separate from television distribution facility 16 using communications paths that are separate from communications paths 24 and 26.

Certain functions such as pay program purchasing may require set-top boxes 28 to transmit data to television distribution facility 16 over communications paths 24. If desired, such data may be transmitted over telephone lines or other separate communications paths. If functions such as these are provided using facilities separate from television distribution facility 16, some of the communications involving set-top boxes 28 may be made directly with the separate facilities.

Each user has a receiver, which is typically a set-top box such as set-top box 28, but which may be other suitable television equipment into which circuitry similar to set-top-box circuitry has been integrated. Program guide data is distributed to set-top boxes 28 periodically, continuously, or on demand. Television distribution facility 16 may also poll set-top boxes 28 periodically for certain information (e.g., pay program account information or information regarding programs that have been purchased and viewed using locally-generated authorization techniques). Main facility 12 preferably contains a processor to handle information distribution tasks. Each set-top box 28 preferably contains a processor to handle tasks associated with implementing a program guide application on the set-top box 28. Television distribution facility 16 may contain a processor for tasks associated with monitoring a user's interactions with the interactive program guide implemented on set-top boxes 28 and for handling tasks associated with the distribution of program guide data and other information to user television equipment 40.

Each set-top box 28 is typically connected to an optional videocassette recorder 30 so that selected television programs may be recorded. Each videocassette recorder 30 is connected to a television 32. To record a program, set-top box 28 tunes to a particular channel and sends control signals to videocassette recorder 30 (e.g., using an infrared transmitter) that direct videocassette recorder 30 to start and stop recording at the appropriate times.

During use of the interactive television program guide implemented on set-top box 28, television program listings and other information may be displayed on television 32. Such program guide displays may be presented on top of a television program to which the user has tuned with set-top box 28 or may be presented in place of such a program. Guide displays may be in the form of a grid, a list, or any other suitable format. Each set-top box 28, videocassette recorder 30, and television 32 may be controlled by one or more remote controls 34 or any other suitable user input interface such as a wireless keyboard, mouse, trackball, dedicated set of buttons, etc. Remote controls such as remote control 34 have various buttons that may be pressed by the user such as cursor keys (for on-screen movement of a highlight region, scrolling functions, etc.), an enter key (for making a selection), channel number keys (for selecting a television channel), a favorites key (to invoke functions related to user preferences), etc.

PC equipment, such as PC equipment 22, may also be used with the interactive program guide. Web browsers or other applications implemented on CPU 36 may be used to access and display the program guide information on the PC monitor 38. User selections and inputs may be made by a keyboard 40, mouse, trackball, or other PC input devices. If desired, program guide data may be provided to user PC equipment 22 over the Internet or any other suitable communications path separate from communications path 26. It is understood that the following discussion, although directed to user television equipment and set top boxes, is applicable to program guides used in connection with PC equipment.

Modern cable and satellite systems provide users with a wide range of programming, of which only a portion may be of interest at a particular time. The subject invention allows users to selectively modify the appearance of their program guides to highlight particular programming that the user has defined an interest in. As described above, program listings data provides various program characteristics, such as program title, program genre or category, actors, etc. The user may select particular program characteristics (of the many available) to serve as preference attributes and assign a color for each preference attribute. The preference attribute and its respective colors are associated as display criteria for use by the program guide. More particularly, the colors may be displayed in the program guide to provide visual emphasis to programming that meets the preferred criteria, and to allow the user to quickly and easily recognize such programming. Programming which does not fall within the preferred criteria is also displayed, although without particular color coding.

The subject invention provides several ways the user can define programming preferences with greater specificity than simply by channel or broad genre. The user may select particular ones of the program characteristics as preference attributes. For example, preference attributes may be the title of a serial program or the name of an actor. Likewise, a preference attribute may be a programming genre or category, or a topic of interest. Thus, a user may inform the program guide that the user likes a particular serial program, such as "60 Minutes," a particular actor, such as John Wayne, a particular programming category, such as soap operas. Conversely, a user may inform the program guide of programs, actors, or genres that the user dislikes. The preference attributes are selected from the program listings data, described above. For each of these preferences, the user may assign a color. After the selections have been made, the program guide may access program listings data and search for programming having the preferred preference attributes. When a program satisfies any of the above criteria, the program guide then displays the listing or cell associated with the television program in an associated color.

The program guide implemented on set-top box 28 provides various options that allow the user to specify which program characteristics will serve as preference attributes and will be specially colored in the television program listings information that is displayed for the user. Such options may be provided in the form of clickable menu items, drop-down lists, or any other suitable format. The user may select a desired menu item using a highlight region, cursor, arrow, or other suitable on-screen indicator that may be positioned over an option on the display (i.e., television 32). For example, a user may position a highlight region over a desired menu item and press "OK" on remote control 34 to complete the selection. Selections that involve entering characters may be made by selecting characters from characters displayed on the screen (e.g., using cursors to move through the alphabet) or by using a wireless keyboard or other alphanumeric entry device.

The user may define preference attributes and assign colors to these attributes in several ways. These selections are typically organized in a profile (sometimes called a preference profile or a favorites profile), which may be set up according to several possibilities. (see, for example, Ellis et al. U.S. patent application Ser. No. 09/034,934, filed Mar. 4, 1998, which is hereby incorporated by reference herein in its entirety). A first approach for setting up a profile, which may be performed during an initial set up procedure, permits the user to scan through the various program listings data, select preferred criteria, and assign colors to each one, if desired. A second approach permits the program characteristics of a particular favorite (or disfavored) program to be retrieved and particular characteristics of the favorite program to be selected as preference attributes and assigned colors to aid in recognizing later broadcasts of similar program content. A third approach permits the user to access previously designated preference attributes and associated colors, and to modify these selections individually.

Figure 2:
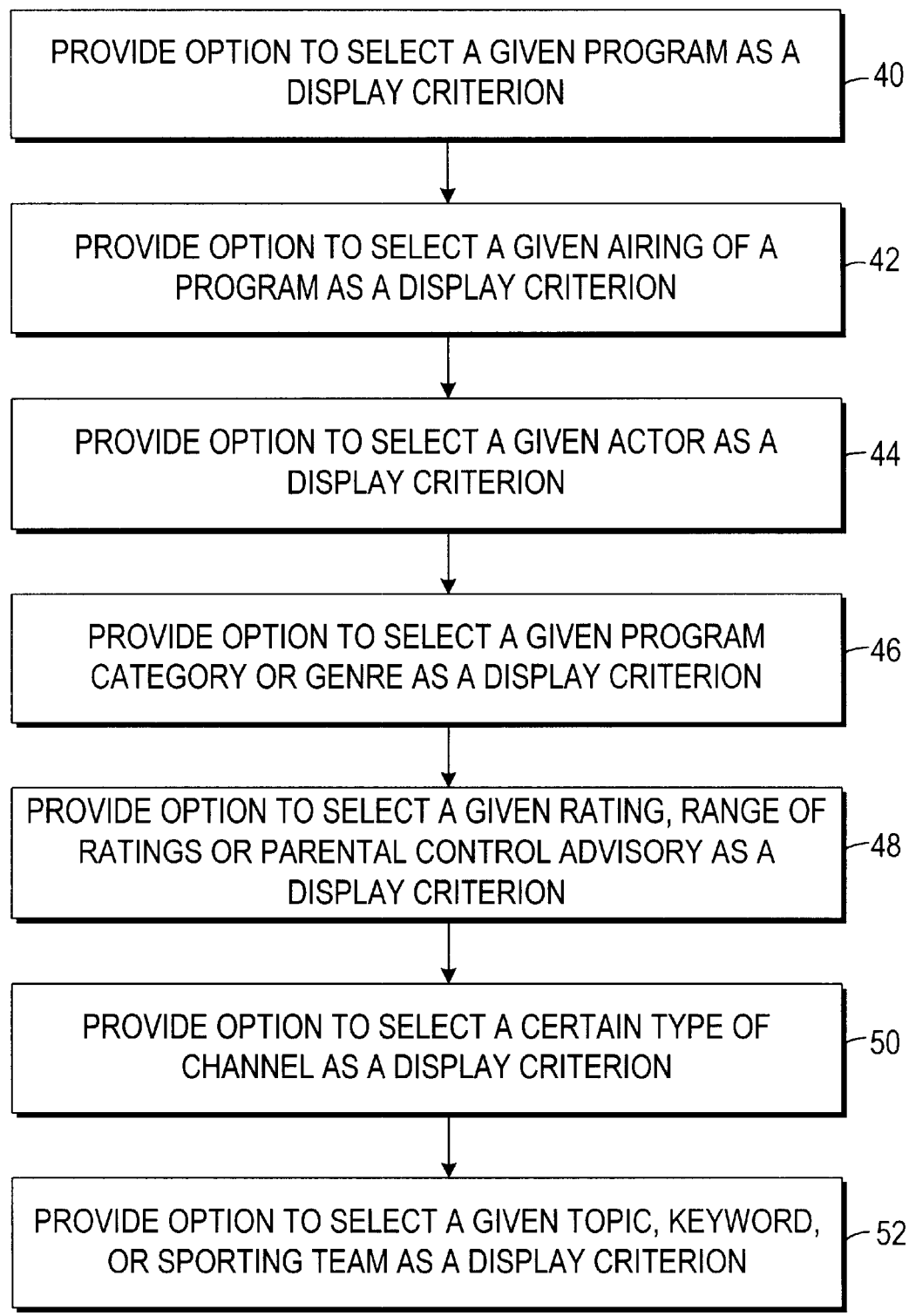
FIG. 2 is a flow chart of steps involved in providing options for selecting various display criteria in accordance with the present invention.

Set up procedures according to the first approach to select preference attributes and assign colors to the program guide are shown in FIG. 2. At step 40 of FIG. 2, the program guide may provide the user with the option of selecting a given program and color as a display criterion. As illustrated at step 60 in FIG. 3, the user selects the program as a preference attribute. For example, the user could indicate an interest in the "60 Minutes" program, whenever it is aired. The user may select the program name from a list of available programs, or the user may type the program name, as described in greater detail, below. At step 62, the user is given the opportunity to set one of at least several colors for the selected program. After selecting a color for the display criterion "60 Minutes", whenever the program guide displays a list of available programs, the "60 Minutes" program will be displayed in the selected color. This feature allows a user to easily recognize a program when it appears in the program listing. The user is then given the opportunity to select another program title at step 64.

Figure 3:
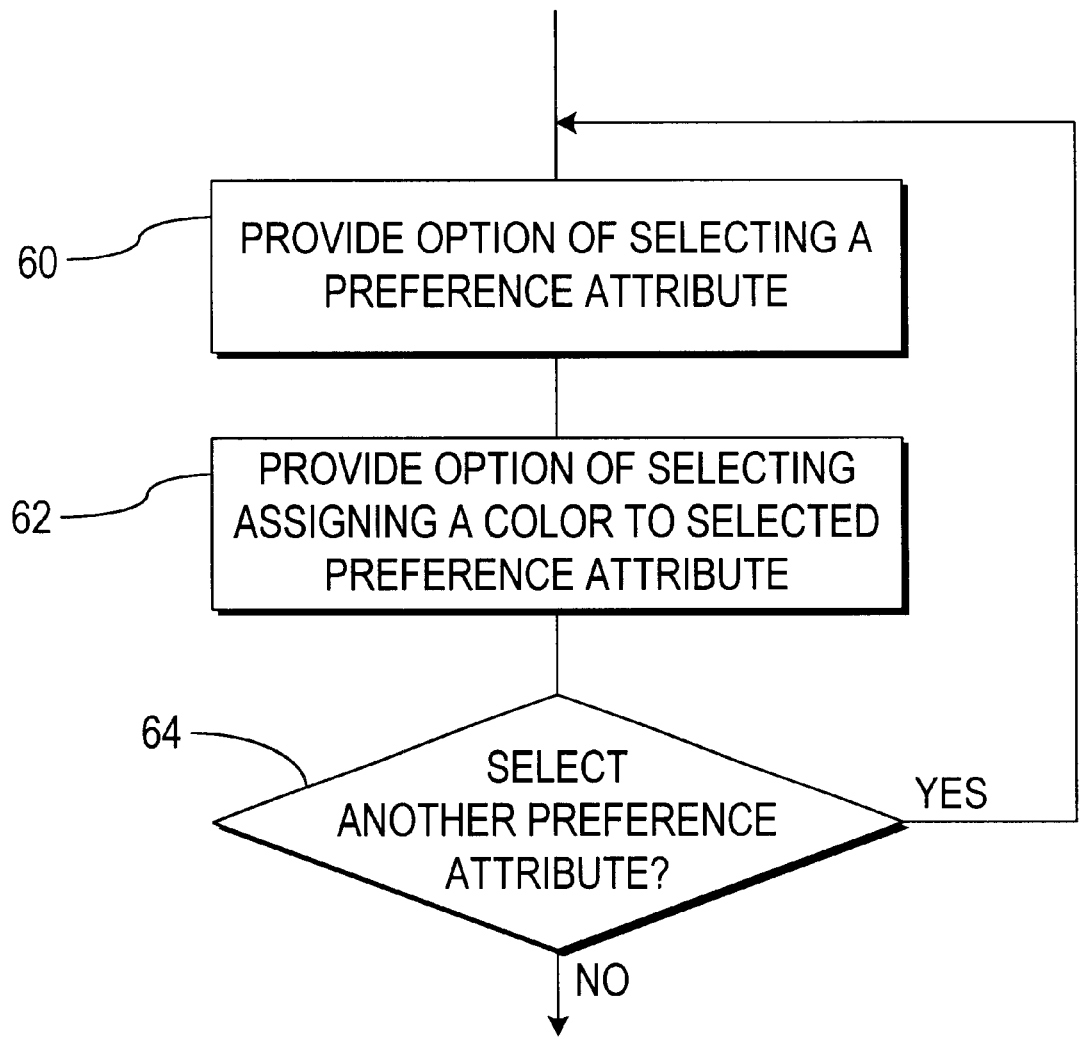
FIG. 3 is a flow chart showing further steps involved in providing options for selecting display criteria.

With continued reference to FIG. 2, step 42 may provide the user with the option of selecting a given airing of a program and a color as a display criterion. For example, if the user wishes to watch the next broadcast of the program "60 Minutes" at 7:00 on Sunday, the user may select that broadcast of "60 Minutes" as a preference attribute. As illustrated in FIG. 3, the selection of the specific airing is made at step 60, and the color selection is made at step 62. The user may then be provided at step 64 with an opportunity to select another given airing of a program.

At step 44, the program guide may provide the user with the option of selecting a particular actor or actress and a color as a display criterion at step 62 (FIG. 3). As described above, step 64 prompts the user to select another actor, if desired, and assign it a color.

At step 46, the program guide may provide the user with the option of selecting as a display criterion a program genre (category) or other suitable grouping (e.g., all programs aired on Sundays, etc. —that are not in a traditional genre, but that are in some way related) and a color. For example, the genre (which may be a sub-genre) may be children's programming, news, weather, movies, action, horror, baseball, football, comedy, etc. Step 60 (FIG. 3) provides the user with the option of selecting a program genre, and step 62 provides the user with the option of assigning a color for that program genre.

At step 48, the program guide may provide the user with the option of selecting a rating (G, PG, TV-Y, etc.), a range of ratings (e.g., the R rating and all ratings for more mature audiences), or a parental control advisory (e.g., this program contains strong language, etc.) and assign a particular color at step 62 (FIG. 3).

At step 50, the program guide may provide the user with the option of selecting a particular type of channel, such as pay-per-view channel, and a color as a display criterion. Assignment of a color to the selected type of channel may occur at step 62 of FIG. 3. Thus the user may be alerted to certain types of programming, e.g., pay-per-view programming, without requiring the user to individually select or even know the names of all of the pay-per-view channels that are available.

At step 52, the program guide may provide the user with the option of selecting a topic (e.g., cooking, photography, music, painting), keyword (e.g., cooks, etc.), or sporting team and a color as a display criterion. When the program listing is displayed, the guide may search the listings data for a topic, keyword that is provided in the information for each program.

The steps involved in providing the preference attributes selection options shown in FIG. 2 are illustrative only and the program guide may provide the user with the option of selecting any other suitable display criteria if desired. Moreover, the order of the steps shown in FIG. 2 is not important. Typically, several such options are provided at the same time (e.g., on the same menu screen). Alternatively, the user may select preference attributes first and subsequently assign all colors after the preference attributes are selected.

Figure 4:
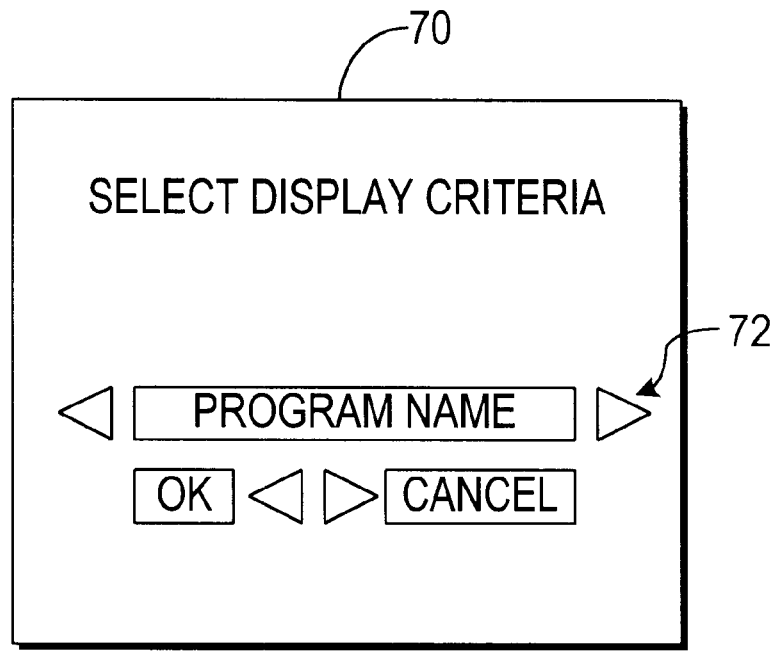
FIG. 4 is an illustrative selection screen for selecting display criteria in accordance with the present invention.
Figure 5:
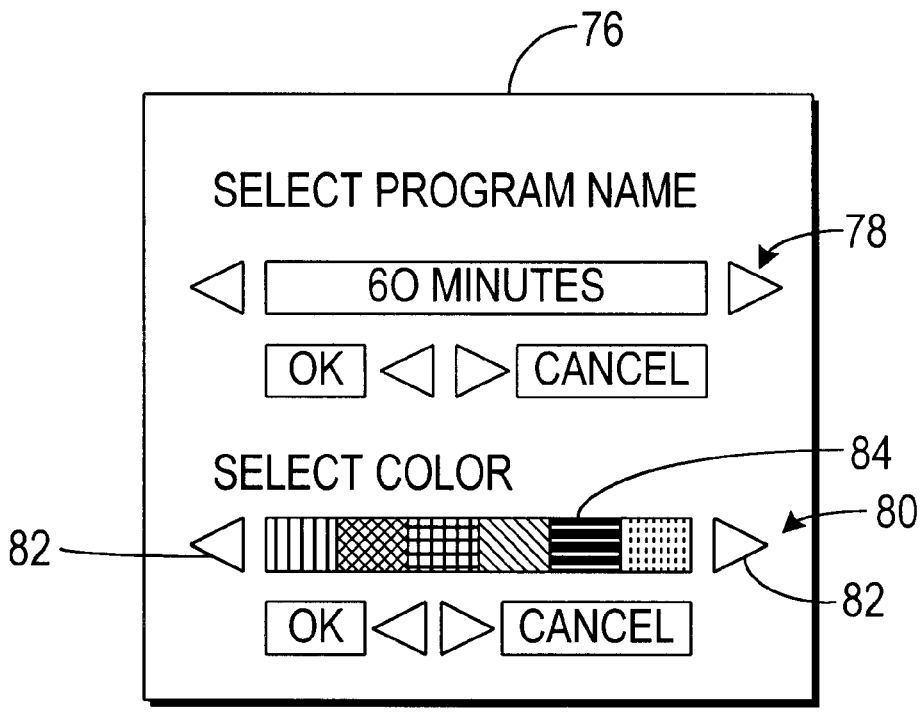
FIG. 5 is an illustrative selection screen for selecting colors associated with the various selected display criteria.

Exemplary display screens which allow the user to select display criteria are illustrated in FIGS. 4 and 5. As illustrated in FIG. 4, the user may be asked to select a preference attribute for color assignment in screen 70. The options presented to the user at option 72 may include the program characteristics illustrated in FIG. 2. For example, the user may select "program name," as shown in the FIG. Screen 76, illustrated in FIG. 5, may be used to allow the user to select a particular program name at option 78. For example, the user may select "60 Minutes." Subsequently, option 80 may permit the user to assign a particular color to the selection "60 Minutes." FIG. 5 illustrates a list of available colors for selection. The user may use the color selection keys 82 to highlight a particular color 84, and make a selection. Alternatively, the user may select a color from a color wheel, a list of colors, or by representing the color by word name, i.e., the word "blue." In order to distinguish between various colors, it is contemplated that the colors selected may include colors represented on different backgrounds, e.g., solid or striped, or the colors may be combined with various icons or symbols.

Figure 7:
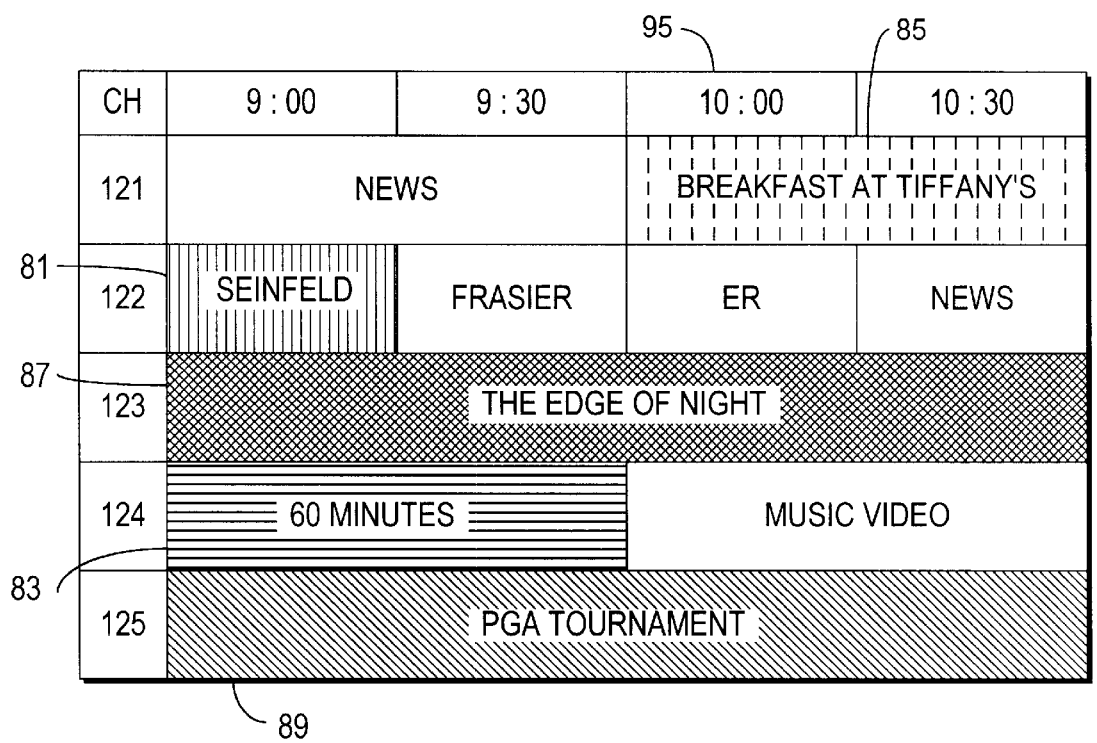
FIG. 7 is an illustrative by-time program listings display in accordance with the present invention.

An illustrative preference profile 90 containing a number of display criteria is shown in FIG. 6. Display criteria are displayed such that preference attributes 92 are adjacent associated colors 94. FIG. 7 shows an illustrative program guide display screen 95 that may be generated by the subject invention using the preference profile of FIG. 6. For example, the programs "Seinfeld" (red) and "60 Minutes" (blue) were selected as display criteria, and cells 81 and 83 are appropriately displayed. The actress Audrey Hepburn (purple) had been selected as display criteria. Consequently, cell 85 for "Breakfast at Tiffany's," a program starring Audrey Hepburn, is displayed in the associated color purple. Additional display criteria selected were golf (green) and soap operas (orange) as the program categories. Thus, cell 87 for soap opera "The Edge of Night" is displayed in orange, and cell 89 for golf program "PGA Tournament" is displayed in green. The remaining cells are displayed for the user's information, but are not highlighted. The program guide display screen of FIG. 7 is illustrative only.

Figure 8:
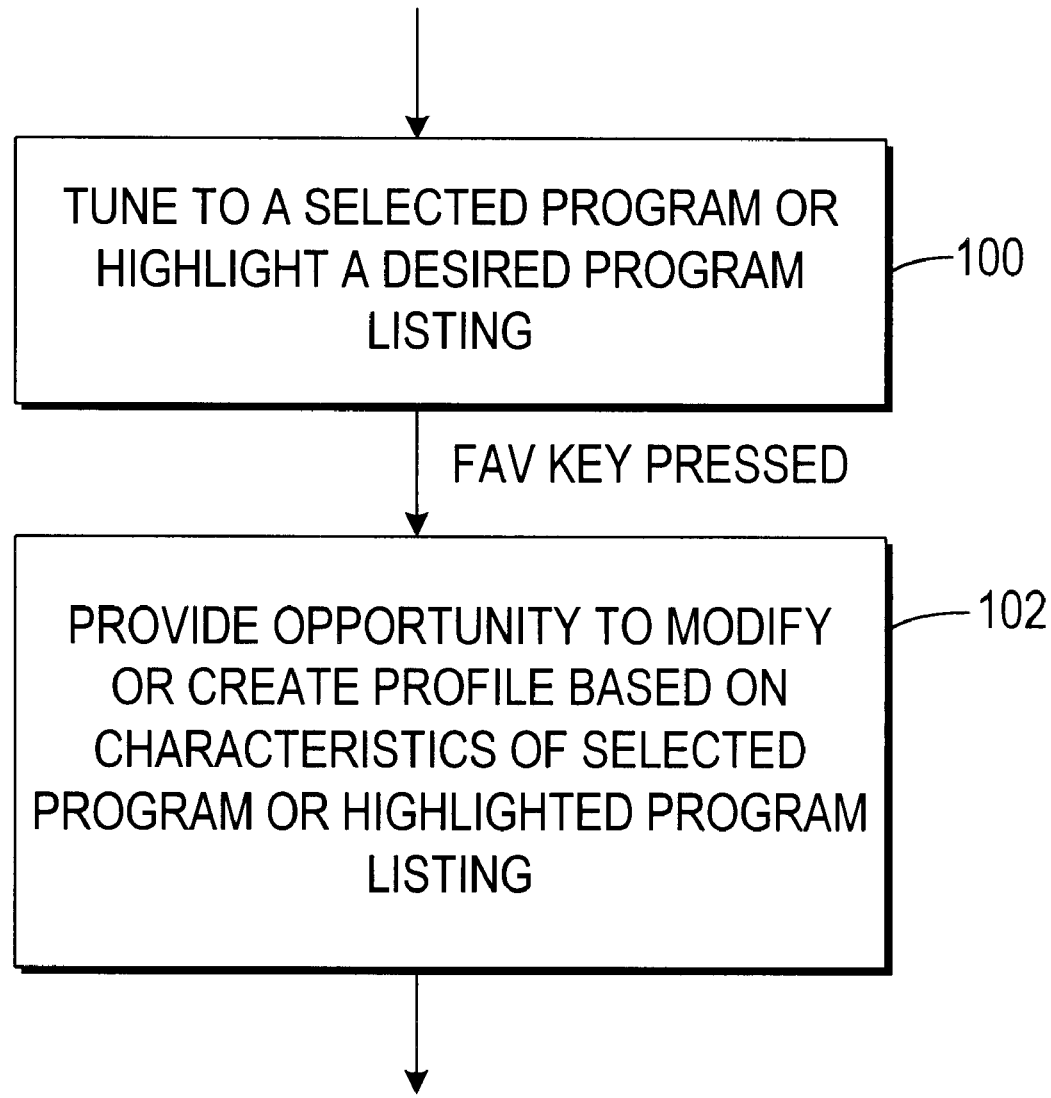
FIG. 8 is a flow chart illustrating how the program guide provides an opportunity to modify a profile based on the criteria of a selected program in accordance with the present invention.

In accordance with the second approach, display criteria may be selected by example. This is illustrated in FIG. 8. At step 100, the user may tune set-top box 28 to a channel (e.g., channel 9) to watch a desired television program (e.g., the program "60 Minutes") or may highlight a desired program listing on any suitable program listings screen. The user may then press an appropriate button on the remote control (e.g., a "FAV" or favorites key) or may click on an on-screen option. The program guide then provides an opportunity to modify or create a profile based on the program characteristics of the selected program or the highlighted program listing at step 102.

Figure 9:
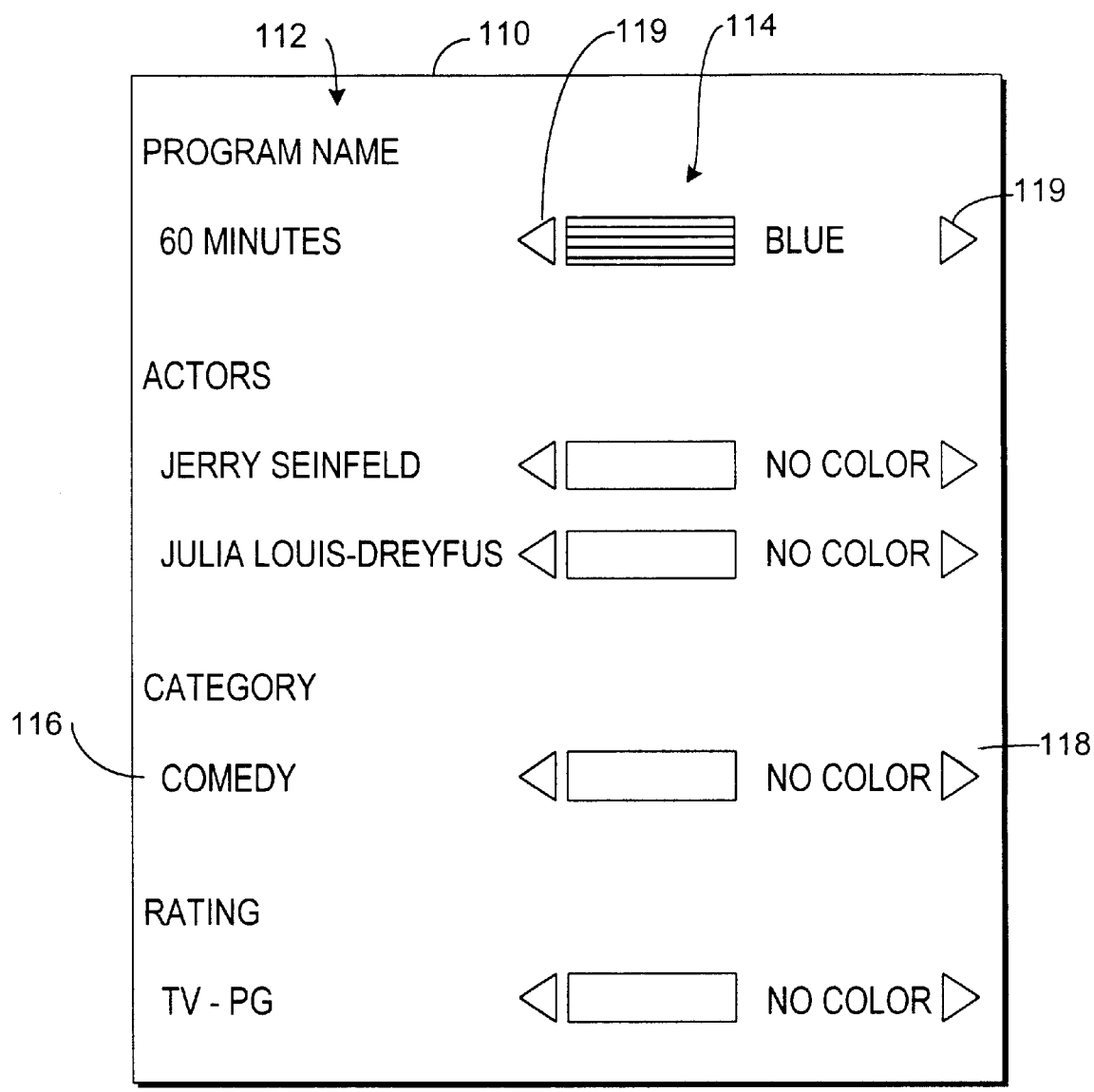
FIG. 9 is a diagram of an illustrative profiles display in accordance with the present invention.

For example, as shown in FIG. 9, the program guide may present a profiles display, such as profiles display 110, in which all characteristics of the selected program or highlighted program listing ("Seinfeld") are listed in column 112. The characteristics listed in column 112 are available from the program listings data. Where program characteristics have been selected as preference attributes, the associated colors are listed in column 114. The neutral selection "no color" is displayed as a default, as shown in the FIG., wherein no color selection has been made for the characteristics such as actor, category, or rating. After selecting the program, additional program characteristics, such as the category comedy 116, may be selected as a preference attribute and a color assigned at option 118. Previously selected colors in column 114 may be modified for each of the other attributes listed in column 120 by color selection keys 119. If desired, a previously selected criteria may be deselected from the profile.

Figure 10:
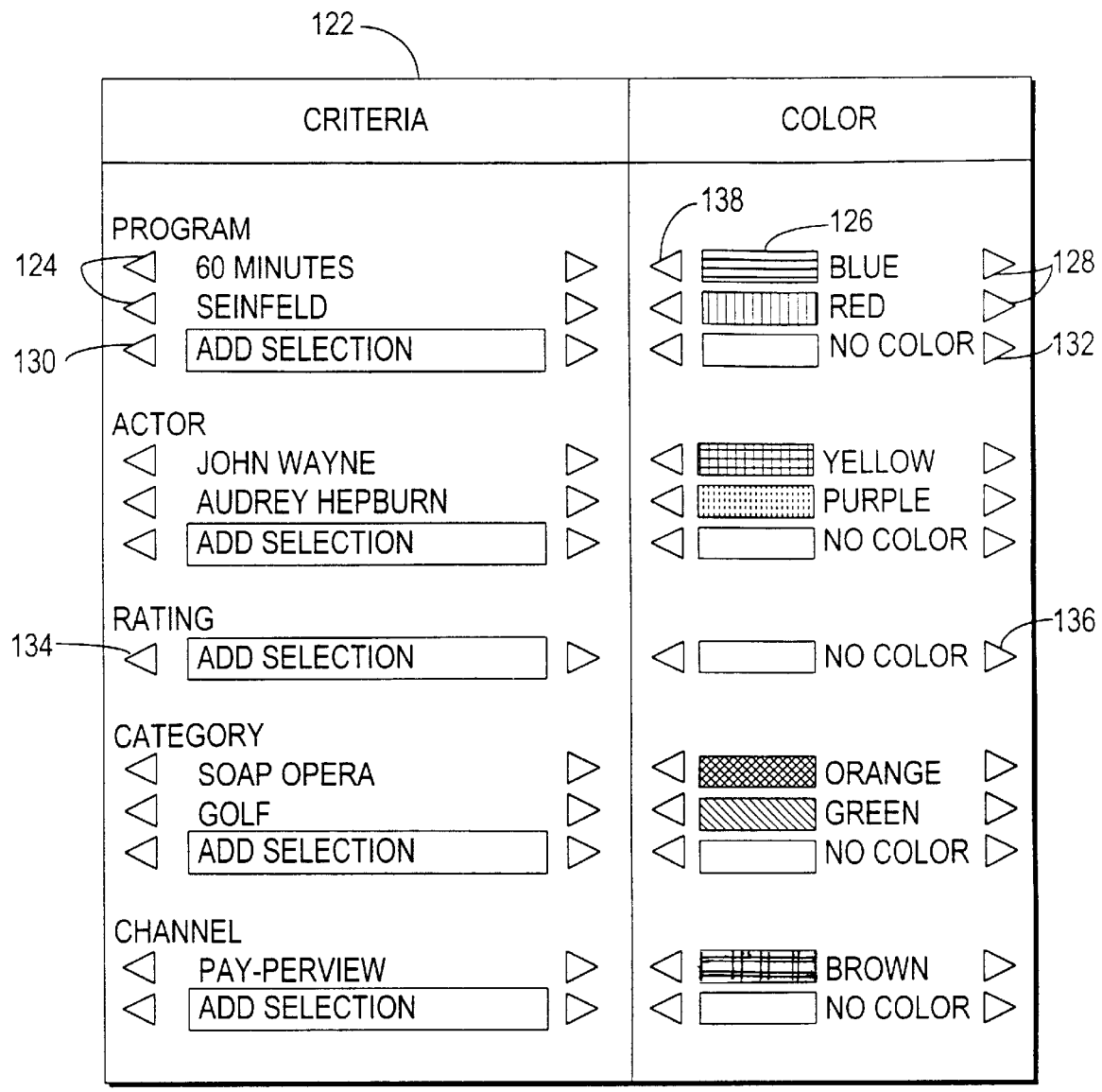
FIG. 10 is a diagram of another illustrative profiles display in accordance with the present invention.

The third approach in which profiles may be modified is shown in FIG. 10. Profiles display 122 of FIG. 10 allows the user to view all selected display criteria for a given profile. Option 124 allows the user to select or change programs as display criteria. When a particular program is selected for option 124, the associated color 126 is displayed with it. Option 128 allows the user to set colors for various programs. Option 130 allows the user to add program titles to the profile. Option 132 allows the user to set colors for the additional programs. For some program characteristics, no display criteria have been selected. (E.g., no ratings have been selected.) Option 134 allows the user to select a rating as a display criteria, and option 136 permits the user to select a color for that rating. The options shown in profiles display 122 are illustrative only. The format of the options shown in FIG. 10 is only illustrative.

Other user interfaces may be used by the program guide if desired. For example, it may be preferable to select colors from a list (i.e., using arrows 138 in option 128 to select from among various available colors). In option 130, the program guide may allow the user to enter the first few characters of a desired title. The program guide may then present a list of available titles that start with those letters. When the list has been narrowed sufficiently, the user may select the desired program title from the list. The program guide may allow text to be entered letter by letter using the cursor keys on the remote to change each letter, using a wireless keyboard, using the numeric keys on the remote to enter letters corresponding to a telephone keypad, etc. If desired, the program guide may allow users to remove attributes from the profile being modified using profiles display 122.

The user may be given the option to select how the color information is presented in the program guide. As described above with respect to FIG. 9, a program has several program characteristics, i.e., program title, rating, actors, etc. The user may select particular characteristics as preference attributes and assign a color for each preference attribute, thereby creating a display criterion. Thus any program may meet more than one of the selected display criteria and therefore, may have more than one color associated with it. For example, the user may have created a display criterion for displaying dramas in blue. Moreover, the user may have also created a display criterion for displaying programming with actor Humphrey Bogart in yellow. Thus, when "Casablanca," a drama with Humphrey Bogart, is displayed in the program guide, at least two colors, yellow and blue are appropriate for display. The program guide may provide the user with the option to decide which, if any, display criterion are to be used. At step 140 of FIG. 11, the user is given the option to select the maximum number of colors to be displayed for any one program in a cell. For example, the user may want to display only one color for a program cell.

Figure 11:
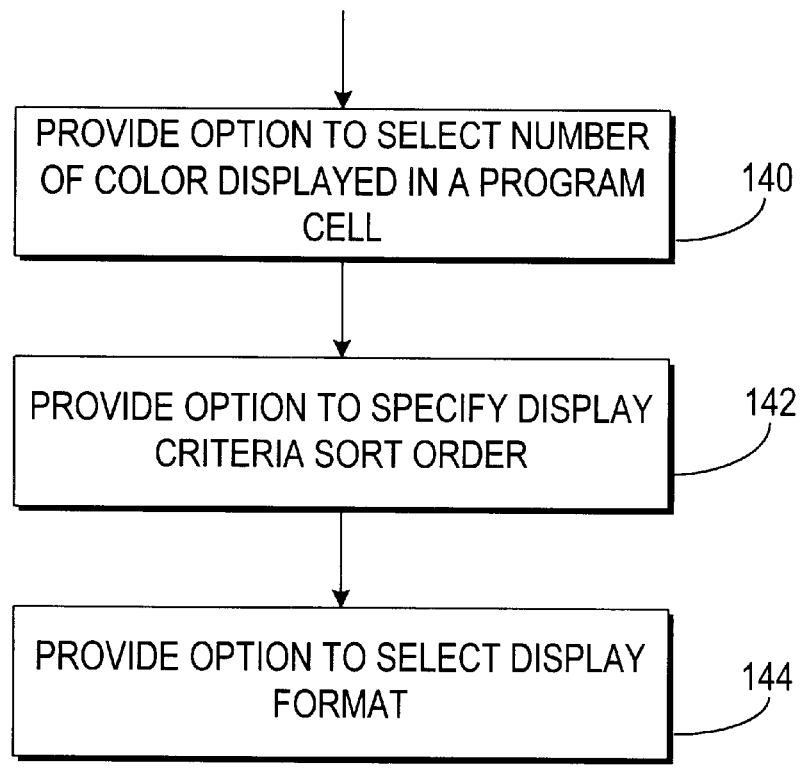
FIG. 11 is a flow chart of steps involved in selecting a display format in accordance with the present invention.

As illustrated in FIG. 11, the program guide provides the user with the option of specifying the sort order (i.e., priority) for each of the selected display criteria at step 142. For example, the user may decide that the category dramas is of particular interest and the cast of actors is of secondary interest. According to this priority, the user would want programming ("Casablanca") that has both a selected category (drama) and a selected actor (Humphrey Bogart) to be displayed according to the higher priority criteria, i.e., blue for dramas. Thus, when displaying programs that satisfy more than one display criterion, the program cell will be displayed in the color of the criterion having the highest priority. This feature is particularly useful when a user wishes to further simplify the process of selecting programs that may be of interest.

Alternatively, the user may select at step 140 that a program be displayed in two (or more) colors for the relevant program. Continuing with the example above, the user may prefer instead to be alerted to the fact that "Casablanca" is a drama and also features actor Humphrey Bogart. Thus, the user would wish to see "Casablanca" displayed in both blue and yellow colors.

Figure 13:
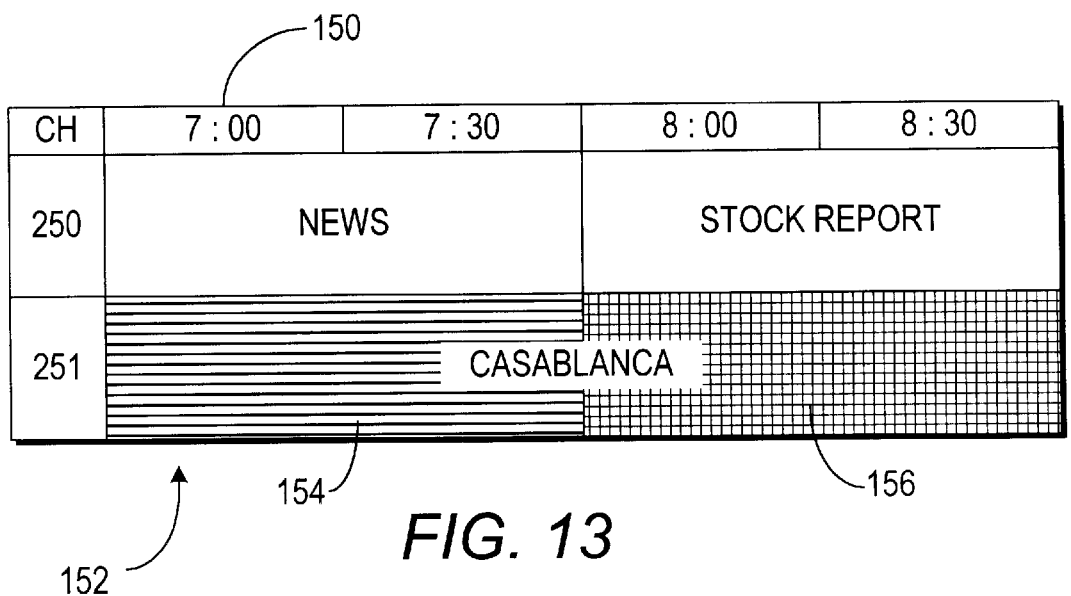
FIG. 13 is another illustrative by-time program listings display in accordance with the present invention.
Figure 14:
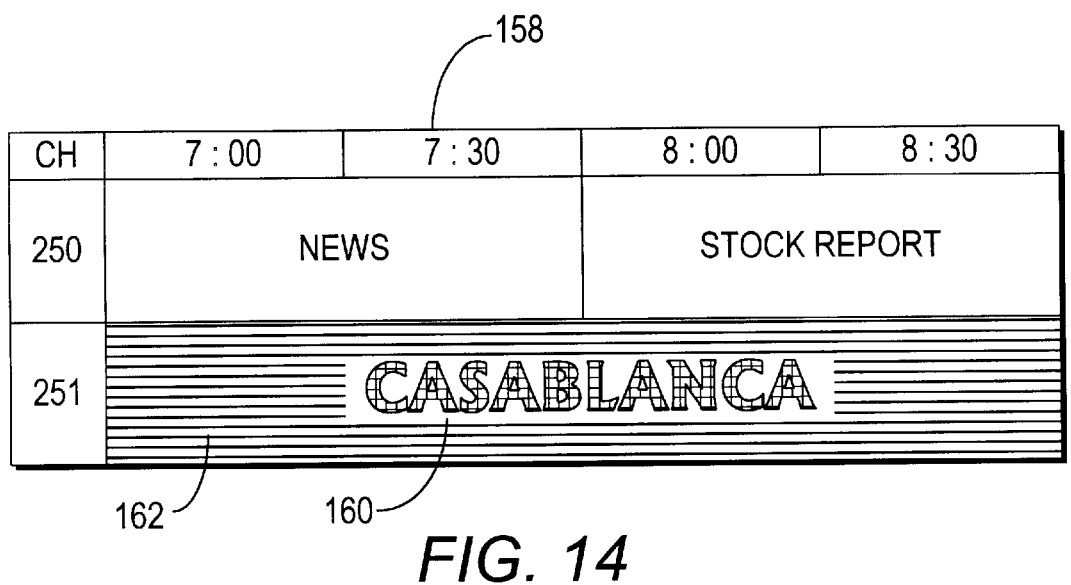
FIG. 14 is yet another illustrative by-time program listings display in accordance with the present invention.

At step 144 (FIG. 11), the user has the option of setting the display format of the guide. Colors associated with each criterion may be displayed simultaneously in a cell for a single program listing. For example, multiple colors may be displayed in equally sized color blocks in a program listing. FIG. 13 illustrates a by-time display 150, wherein the cell 152 for "Casablanca" is displayed in two colors, i.e. blue block 154 and yellow block 156. Alternatively, a color may be selected for text, and a different color may be selected for the background field. As FIG. 14 illustrates for by-time display 158, the text 160 for the title "Casablanca" is represented in yellow, and the background 162 is represented in blue. Alternatively, a plurality of colors may be represented in alternating stripes, in patterns, or any other format for displaying two or more colors in a single program listing cell.

Figure 12:
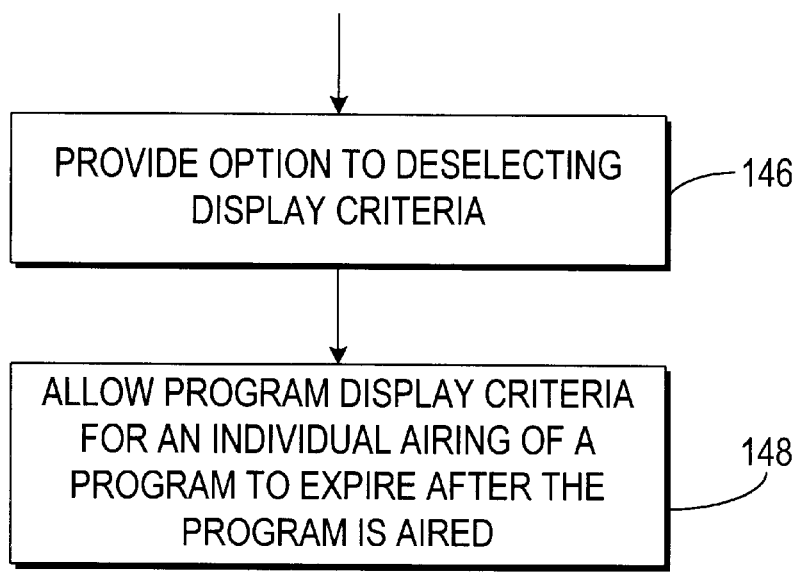
FIG. 12 is a flow chart of steps involved in allowing a selected. preference attribute to expire or be deselected in accordance with the present invention.

The program guide may allow colors that have been selected by the user to remain valid until deselected by the user (step 146) illustrated in FIG. 12. Alternatively, when a user selects an individual airing of a program as part of a preference profile, the program guide will allow that selection to expire at the end of the program. This is shown as step 148 in FIG. 12.

If there are several users (e.g., different family members) associated with a given program guide, each user may have his own profile. A profile may contain more than one display criterion of the same type. For example, preference profile 80 of FIG. 6 has two series criteria ("Seinfeld" and "60 Minutes"), two actor criteria (John Wayne and Audrey Hepburn), and two category criteria (golf and soap operas). Although six display criteria have been illustrated in three general groupings in the exemplary profile, the user may select as many criteria as desired.

The program guide allows multiple profiles to be used. For example, different users (e.g., different family members who share user television equipment 40) may each have their own profile. One profile may be used for children. Another profile may be used for children when watching television with their parents (who can supervise). A profile may be created for each adult. Another profile may be created for adults to use when watching television together.

Figures 15, 17:
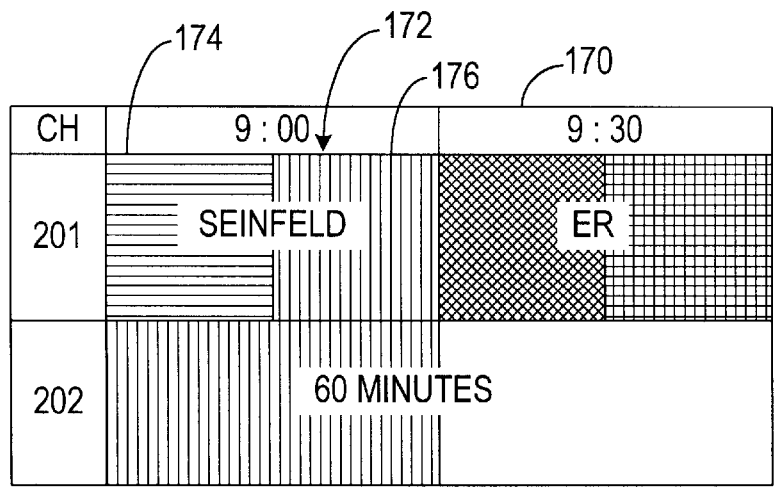
FIG. 15 is a diagram illustrating how multiple profiles may be used and how a given display criteria may be associated with more than one such profile in accordance with the present invention.
FIG. 17 is an illustrative by-time program listings display in accordance with the present invention.

An illustrative set of profiles is shown in FIG. 15. Profile No. 1 belongs to a first user who has designated the serial program "Seinfeld" (blue), the serial program "60 Minutes" (red), and the category drama (orange) as display criteria. Profile No. 2 belongs to a second user who has designated the program ER (yellow) and the category comedy (red) as display criteria. Profile No. 3 belongs to a third user who has designated the category comedy (yellow), the actor James Stewart (blue), and the program X-Files (green).

Although each profile has its own independent set of display criteria, any given criterion may be in more than one profile. For example, the criterion comedy appears in both profile No. 2 and profile No. 3 (although with different colors assigned to each).

Figure 16:
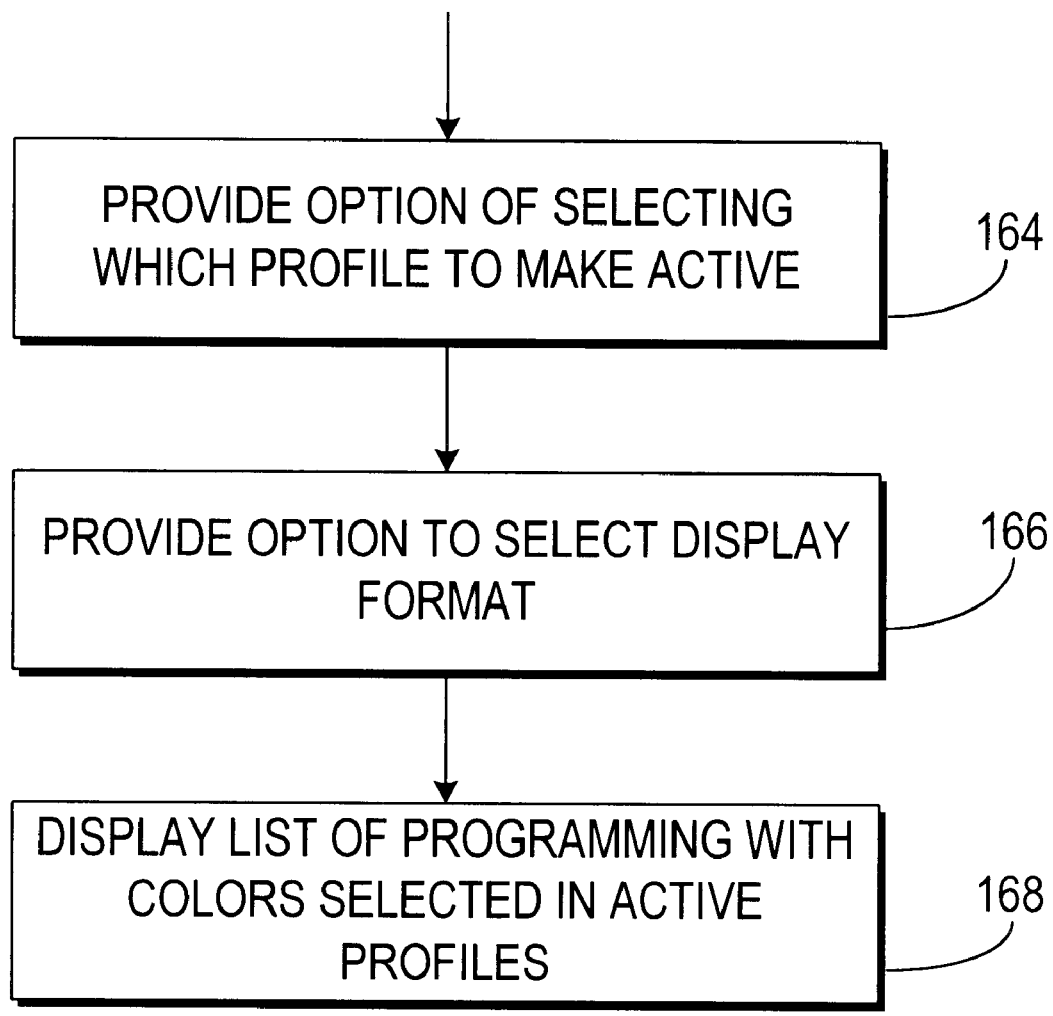
FIG. 16 is a flow chart of steps involved in selecting a profile to make active and displaying programming based on one or more active profiles in accordance with the present invention.

When a user desires to use the program guide, the user may activate an appropriate profile. As shown in FIG. 16, the program guide provides users with the option of selecting which profile to make active at step 164. More than one profile may be active at a given time.

When multiple profiles are used at the same time, the program guide may provide the user the option of selecting a display format at step 166, and subsequently displaying the list of programming at step 168. According to one display format, the program guide may display the criteria for a single profile only. (For this purpose, a master profile may be designated.) Alternatively, the program guide may display colors for each active profile in a given field within the program cell. As yet another alternative, the colors for each profile may be displayed in a unique field or background. These techniques for following multiple profiles to be active at the same time are illustrative only. Any other suitable technique may be used if desired.

For example, when multiple listings are active, the user may select at step 166 that colors for all active profiles will be displayed in a particular field, or portion, of the cell. Thus, when a program satisfies the criteria of both Profiles No. 1 and No. 2 (FIG. 14), the program guide may display Profile No. 1 selections on the left of each cell, and Profile No. 2 selections on the right of each cell. In the by-time listings display 170 of FIG. 17, the programs "Seinfeld," "60 Minutes", and the category drama satisfy the display criteria in Profile No. 1. The program ER and the category comedy satisfy the display criteria in Profile No. 2. The "Seinfeld" cell 172 contains two colors, one in each field, indicating that the program "Seinfeld" satisfies the criteria in both Profiles No. 1 and No. 2. Thus left field 174 corresponds to Profile No. 1 selections and right field 176 corresponds to Profile No. 2. To further distinguish the selections of two profiles, the colors may be displayed for each profile on a different pattern, such as a solid or striped background.

Alternatively, the colors for each profile may be displayed with a unique icon. These display formats are merely illustrative examples of suitable visual indicators for easily distinguishing between the display criteria of two or more profiles. These approaches may be used in any suitable combination or any other suitable approach may be used to distinguish the results satisfying different profiles.

The foregoing is merely illustrative of the principles of this invention and various modifications can be made by those skilled in the art without departing from the scope and spirit of the invention.

What is claimed is:

1. An interactive television program guide system implemented on user equipment of a user, comprising:

means for providing an option with the interactive television program guide for a user to select a plurality of preference attributes that are indicative of the user's television programming interests;

means for providing an option for the user to select one of at least several colors for each of the plurality of selected preference attributes; and means for displaying a list of programming based on the selected preference attributes and the selected colors.

2. The interactive television program guide system defined in claim 1 wherein the means for providing the option for the user to select a plurality of preference attributes comprises means for providing an option of selecting a program series as a preference attribute.

3. The interactive television program guide system defined in claim 1 wherein the means for providing the option for the user to select a plurality of preference attributes comprises means for providing an option of selecting a given airing of a program as a preference attribute.

4. The interactive television program guide system defined in claim 1 further comprising means for allowing the given airing of the program selected as a preference attribute to expire after the program has been aired.

5. The interactive television program guide system defined in claim 1 wherein the means for providing the option for the user to select a plurality of preference attributes comprises means for providing an option of selecting a given actor or actress as a preference attribute.

6. The interactive television program guide system defined in claim 1 wherein the means for providing the option for the user to select a plurality of preference attributes comprises means for providing an option of selecting a genre of programming as a preference attribute.

7. The interactive television program guide system defined in claim 1 wherein the means for providing the option for the user to select a plurality of preference attributes comprises means for providing an option of selecting at least one rating as a preference attribute.

8. The interactive television program guide system defined in claim 1 wherein the means for providing the option for the user to select a plurality of preference attributes comprises means for providing an option of selecting a type of channel as a preference attribute.

9. The interactive television program guide system defined in claim 1 wherein the means for providing the option for the user to select a plurality of preference attributes comprises means for providing an option of selecting a given topic as a preference attribute.

10. The interactive television program guide system defined in claim 1 wherein the means for providing the option for the user to select a plurality of preference attributes comprises means for providing an option of selecting a word in a program description as a preference attribute.

11. The interactive television program guide system defined in claim 1 wherein each one of the selected preference attributes and the respective one of the selected colors are associated as a display criterion, and further comprising:

means for providing an option of creating a preference profile with which the display criteria are associated.

12. The interactive television program guide system defined in claim 11 further comprising:

means for allowing the user to highlight a given program listing, wherein the means for providing the option of creating a preference profile further comprises means for providing an option of creating the preference profile based on program information of the highlighted program listing.

13. The interactive television program guide system defined in claim 12 wherein the program information comprises a title of the highlighted program listing and the means for providing the option of creating the preference profile based on the program information of the highlighted program listing further comprises means for providing an option of selecting the title of the highlighted program listing as a preference attribute.

14. The interactive television program guide system defined in claim 12 wherein the program information comprises a genre of the highlighted program listing and the means for providing the option of creating the preference profile based on the program information of the highlighted program listing further comprises means for providing an option of selecting the genre of the highlighted program listing as a preference attribute.

15. The interactive television program guide system defined in claim 12 wherein the program information comprises a channel of the highlighted program listing and the means for providing the option of creating the preference profile based on the program information of the highlighted program listing further comprises means for providing an option of selecting the channel of the highlighted program listing as a preference attribute.

16. The interactive television program guide system defined in claim 12 wherein the program information comprises a rating of the highlighted program listing and the means for providing the option of creating the preference profile based on the program information of the highlighted program listing further comprises means for providing an option of selecting the rating of the highlighted program listing as a preference attribute.

17. The interactive television program guide system defined in claim 11 further comprising:

means for allowing the user to tune to a selected program, wherein the means for providing the option of creating a preference profile further comprises means for creating the preference profile based on the program information of the selected program.

18. The interactive television program guide system defined in claim 17 wherein the program information comprises a title of the selected program and the means for providing the option of creating the preference profile based on the program information of the selected program further comprises means for providing an option of selecting the title of the selected program as a preference attribute.

19. The interactive television program guide system defined in claim 17 wherein the program information comprises a genre of the selected program and the means for providing the option of creating the preference profile based on the program information of the selected program further comprises means for providing an option of selecting the genre of the selected program as a preference attribute.

20. The interactive television program guide system defined in claim 17 wherein the program information comprises a channel of the selected program and the means for providing the option of creating the preference profile based on the program information of the selected program further comprises means for providing an option of selecting the channel of the selected program as a preference attribute.

21. The interactive television program guide system defined in claim 17 wherein the program information comprises a rating of the selected program and the means for providing the option of creating the preference profile based on the program information of the selected program further comprises means for providing an option of selecting the rating of the selected program as a preference attribute.

22. The interactive television program guide system defined in claim 1 further comprising means for providing a profiles display with which the user may modify a preference profile with which the selected preference attributes and the selected colors are associated.

23. The interactive television program guide system defined in claim 1 further comprising means for providing an option of deselecting at least one of the selected preference attributes.

24. The interactive television program guide system defined in claim 11 wherein there are multiple profiles, the system further comprising means for providing an option of selecting which of the profiles to make active.

25. The interactive television program guide system defined in claim 24 wherein at least two of the preference profiles are active and wherein the means for displaying displays the list of programming based on the selected preference attributes and selected colors in the two preference profiles, the system further comprising:

means for indicating which of the programs in the list of programming satisfy which of the preference profiles.

26. The interactive television program guide system defined in claim 25 wherein the means for indicating comprises means for displaying the associated colors that satisfy one of the two profiles in one location in the list and the associated colors that satisfy the other of the two profiles in another location in the list.

27. The interactive television program guide system defined in claim 26 wherein the means for indicating comprises means for displaying the associated colors that satisfy one of the two profiles using one pattern and the associated colors that satisfy the other of the two profiles using another pattern.

28. The interactive television program guide system defined in claim 26 wherein the means for indicating comprises means for displaying the associated colors that satisfy one of the two profiles using one icon and the programs that satisfy the other of the two profiles using another icon.

29. The interactive television program guide system defined in claim 24 wherein the means for displaying the list of programming based on the selected preference attributes and selected colors further comprises means for displaying the list of programming based on the selected preference attributes and selected colors associated with the multiple profiles.

30. The interactive television program guide system defined in claim 24 further comprising means for providing an option for creating a master preference profile.

31. The interactive television program guide system defined in claim 30 wherein the means for displaying a list of programming based on the selected preference attributes and the selected colors further comprises means for displaying the list of programs based on the selected preference attributes and the selected colors of the master profile.

32. The interactive television program guide system defined in claim 1, wherein the user equipment is user personal computer equipment.

33. The interactive television program guide system defined in claim 1, wherein the user equipment is user television equipment.

34. A interactive television program guide system implemented on user equipment of a user, comprising:

means for providing an option for a user to select a plurality of preference attributes that are indicative of the user's television programming interests;

means for providing an option for the user to associate one of at least several colors with each of the plurality of selected preference attributes; and means for displaying a list of programming such that a program having at least one of the selected preference attributes is displayed in the associated color of that preference attribute.

35. The interactive television program guide system defined in claim 34 wherein the means for displaying the list of programming further comprises means for providing an option of specifying a maximum number of associated colors for any one of the programs.

36. The interactive television program guide system defined in claim 35 further comprising means for providing an option of specifying a sort order for each of the selected preference attributes.

37. The interactive television program guide system defined in claim 36 wherein the means for providing an option of specifying a maximum number of associated colors further comprises means for displaying the associated colors according to the sort order for each of the selected preference attributes.

38. The interactive television program guide system defined in claim 34, wherein the user equipment is user personal computer equipment.

39. The interactive television program guide system defined in claim 34, wherein the user equipment is user television equipment.

40. A method for using an interactive television program guide system in which an interactive television program guide is implemented on user equipment of a user, comprising:

providing an option for a user to select a plurality of preference attributes that are indicative of the user's television programming interests;

providing an option for the user to select one of at least several colors for each of the plurality of selected preference attributes; and displaying a list of programming based on the selected preference attributes and the selected colors.

41. The method defined in claim 40 wherein the step of providing the option for the user to select a plurality of preference attributes further comprises providing an option of selecting a program series as a preference attribute.

42. The method defined in claim 40 wherein the step of providing the option for the user to select a plurality of preference attributes further comprises providing an option of selecting a given airing of a program as a preference attribute.

43. The method defined in claim 40 further comprising:

allowing the given airing of the program selected as a preference attribute to expire after the program has been aired.

44. The method defined in claim 40 wherein the step of providing the option for the user to select a plurality of preference attributes comprises providing an option of selecting a given actor or actress as a preference attribute.

45. The method defined in claim 40 wherein the step of providing the option for the user to select a plurality of preference attributes comprises providing an option of selecting a genre of programming as a preference attribute.

46. The method defined in claim 40 wherein the step of providing the option for the user to select a plurality of preference attributes comprises providing an option of selecting at least one rating as a preference attribute.

47. The method defined in claim 40 wherein the step of providing the option for the user to select a plurality of preference attributes comprises providing an option of selecting a type of channel as a preference attribute.

48. The method defined in claim 40 wherein the step of providing the option for the user to select a plurality of preference attributes comprises providing an option of selecting a given topic as a preference attribute.

49. The method defined in claim 40 wherein the step of providing the option for the user to select a plurality of preference attributes comprises providing an option of selecting a word in a program description as a preference attribute.

50. The method defined in claim 40 wherein each one of the selected preference attributes and the respective one of the selected colors are associated as a display criterion, and further comprising:
providing an option of creating a preference profile with which the display criteria are associated.

51. The method defined in claim 50 further comprising:
allowing the user to highlight a given program listing,
wherein the step of providing an option of creating a preference profile further comprises providing an option of creating the preference profile based on program information of the highlighted program listing.

52. The method defined in claim 51 wherein the program information comprises a title of the highlighted program listing and the step of providing an option of creating the preference profile based on the program information of the highlighted program listing comprises providing an option of selecting the title of the highlighted program listing as a preference attribute.

53. The method defined in claim 51 wherein the program information comprises a genre of the highlighted program listing and the step of providing the option of creating the preference profile based on the program information of the highlighted program listing comprises providing an option of selecting the genre of the highlighted program listing as a preference attribute.

54. The method defined in claim 51 wherein the program information comprises a channel of the highlighted program listing and the step of providing an option of creating the preference profile based on the program information of the highlighted program listing comprises providing an option of selecting the channel of the highlighted program listing as a preference attribute.

55. The method defined in claim 51 wherein the program information comprises a rating of the highlighted program listing and the step of providing an option of creating the preference profile based on the program information of the highlighted program listing further comprises providing an option of selecting the rating of the highlighted program listing as a preference attribute.

56. The method defined in claim 50 further comprising:
allowing the user to tune to a selected program,
wherein the step of providing the option of creating the preference profile further comprises creating the preference profile based on the program information of the selected program.

57. The method defined in claim 56 wherein the program information comprises a title of the selected program and the step of providing the option of creating the preference profile based on the program information of the selected program further comprises providing an option of selecting the title of the selected program as a preference attribute.

58. The method defined in claim 56 wherein the program information comprises a genre of the selected program and the step of providing an option of creating the preference profile based on the program information of the selected program further comprises providing an option of selecting the genre of the selected program as a preference attribute.

59. The method defined in claim 56 wherein the program information comprises a channel of the selected program and the step of providing an option of creating the preference profile based on the program information of the selected program further comprises providing an option of selecting the channel of the selected program as a preference attribute.

60. The method defined in claim 56 wherein the program information comprises a rating of the selected program and the step of providing an option of creating the preference profile based on the program information of the selected program further comprises providing an option of selecting the rating of the selected program as a preference attribute.

61. The method defined in claim 40 further comprising:
providing a profiles display with which the user may modify a preference profile with which the selected preference attributes and the selected colors are associated.

62. The method defined in claim 40 further comprising:
providing an option of deselecting at least one of the selected preference attributes.

63. The method defined in claim 50 wherein there are multiple profiles, the system further comprising:
providing an option of selecting which of the profiles to make active.

64. The method defined in claim 63 wherein at least two of the preference profiles are active and wherein the step of displaying comprises displaying the list of programming based on the selected preference attributes and selected colors in the two preference profiles, the system further comprising:
indicating which of the programs in the list of programming satisfy which of the preference profiles.

65. The method defined in claim 64 wherein the step of indicating comprises displaying the associated colors that satisfy one of the two profiles in one location in the list and the associated colors that satisfy the other of the two profiles in another location in the list.

66. The method defined in claim 65 wherein the step of indicating comprises displaying the associated colors that satisfy one of the two profiles using one pattern and the associated colors that satisfy the other of the two profiles using another pattern.

67. The method defined in claim 65 wherein the step of indicating comprises displaying the associated colors that satisfy one of the two profiles using one icon and the programs that satisfy the other of the two profiles using another icon.

68. The method defined in claim 63 wherein the step of displaying the list of programming based on the selected preference attributes and selected colors further comprises displaying the list of programming based on the selected preference attributes and selected colors associated with the multiple profiles.

69. The method defined in claim 63 further comprising:
providing an option for creating a master preference profile.

70. The method defined in claim 69 wherein the step of displaying a list of programming based on the selected preference attributes and the selected colors comprises displaying the list of programs based on the selected preference attributes and the selected colors of the master profile.

71. A method for using an interactive television program guide system in which an interactive television program guide is implemented on user equipment of a user, comprising:
providing an option for a user to select a plurality of preference attributes that are indicative of the user's television programming interests;
providing an option for the user to associate one of at least several colors with each of the plurality of selected preference attributes; and
displaying a list of programming such that a program having at least one of the selected preference attributes is displayed in the associated color of that preference attribute.

72. The method defined in claim 71 wherein the step of displaying the list of programming comprises providing an option of specifying a maximum number of associated colors for any one of the programs.

73. The method defined in claim 72, further comprising:
providing an option of specifying a sort order for each of the selected preference attributes.

74. The method defined in claim 73 wherein the step of providing an option of specifying the maximum number of associated colors further comprises displaying the associated colors according to the sort order for each of the selected preference attributes.

* * * * *

UNITED STATES PATENT AND TRADEMARK OFFICE
CERTIFICATE OF CORRECTION

PATENT NO. : 6,481,011 B1
DATED : November 12, 2002
INVENTOR(S) : Thomas R. Lemmons It is certified that error appears in the above-identified patent and that said Letters Patent is hereby corrected as shown below:

Drawings,
Sheet 5, FIG. 6, change "SOAP ORERA" to -- SOAP OPERA --;
Sheet 10, FIG. 12, change "PROVIDE OPTION TO DESELECTING DISPLAY CRITERIA" to -- PROVIDE OPTION TO DESELECT DISPLAY CRITERIA --;

Column 1,
Line 7, change "Jun." to -- June --;
Line 15, add a period after "etc.)";

Column 2,
Line 1, change "a" to -- an --;
Lines 16-17, change "to which to which" to -- to which --;

Column 3,
Lines 62-63, no paragraph break;

Column 6,
Line 7, change "(see, for example" to -- (See, for example --;
Line 10, change "entirety)." to -- entirety.) --.

Signed and Sealed this

Seventh Day of October, 2003

JAMES E. ROGAN
*Director of the United States Patent and Trademark Office*